United States Patent [19]

Oliveti

[11] Patent Number: 5,712,053
[45] Date of Patent: Jan. 27, 1998

[54] BIOCHEMICALLY-POWERED SELF-EXCITING ELECTRIC POWER SOURCE

[75] Inventor: Renato Alessandro Oliveti, Rome, Italy

[73] Assignee: Ing. Alessandro Oliveti S.r.L., Milan, Italy

[21] Appl. No.: 272,979

[22] Filed: Jul. 15, 1994

[30] Foreign Application Priority Data

Jul. 19, 1993 [IT] Italy ................................ RM93A0484
Sep. 16, 1993 [IT] Italy ................................ MI93A2002

[51] Int. Cl.⁶ ................................................ H01M 8/16
[52] U.S. Cl. ............................................................ 429/2
[58] Field of Search ................................ 429/2, 81, 111;
361/434, 436

[56] References Cited

U.S. PATENT DOCUMENTS

| 375,441 | 12/1887 | Cox | 429/2 |
| 962,016 | 6/1910 | Fessenden | 329/347 |
| 1,721,886 | 7/1929 | Shulimson | 361/436 |
| 3,228,799 | 1/1966 | Rohrback | 429/2 |

FOREIGN PATENT DOCUMENTS

| 2165087 | 4/1986 | United Kingdom |
| 8203729 | 10/1982 | WIPO |

*Primary Examiner*—Donald R. Valentine
*Assistant Examiner*—Brendan Mee
*Attorney, Agent, or Firm*—Guido Modiano; Albert Josif; Daniel J. O'Byrne

[57] ABSTRACT

Biochemically-powered self-exciting electric power source including, inside a container for containing an electrolyte, an anode which is coated with a biochemical compound, a first electrode, and a second electrode, which are electrically separated from one another and immersed in the electrolyte. There is also an electrical stimulator connected between the anode and the first electrode. A user load can be connected between the second electrode and the anode.

23 Claims, 5 Drawing Sheets

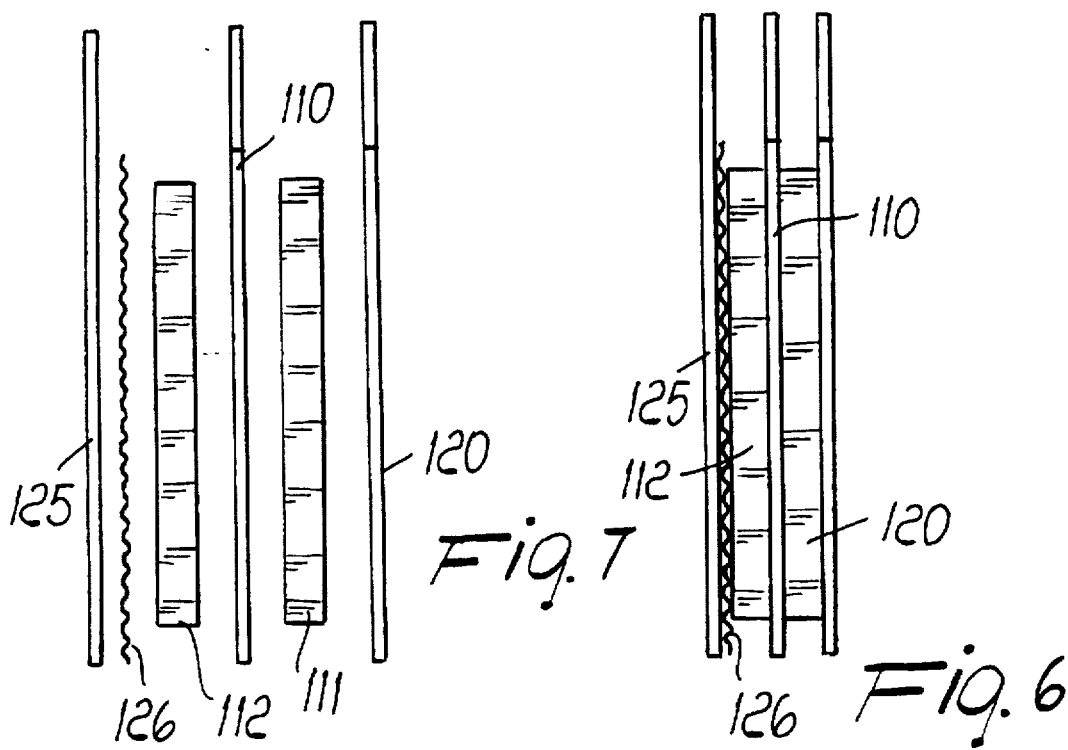
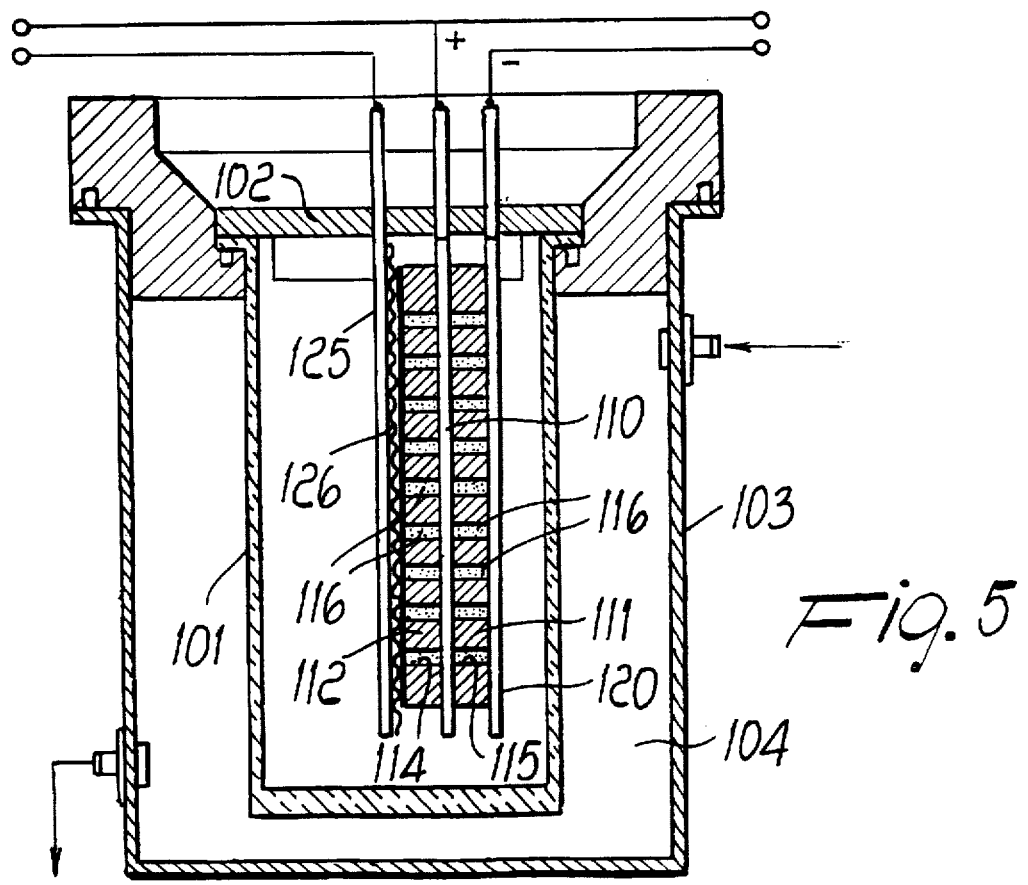

BIOCHEMICALLY-POWERED SELF-EXCITING ELECTRIC POWER SOURCE

BACKGROUND OF THE INVENTION

The present invention relates to a biochemically-powered self-exciting electric power source.

As is known, electric batteries which are currently in use are based on the reversibility of electrolysis and generally require the use of materials that are considered to be highly polluting, such as lead plates and acids for the electrolytes.

In addition to this purely ecological aspect, currently known electric batteries, despite being manufactured with the most advanced technologies, are usually very heavy and have considerable operating costs.

Another drawback is furthermore constituted by the fact that they normally have a very limited endurance and require long recharging times.

SUMMARY OF THE INVENTION

The principal aim of the invention is indeed to solve the problems described above by providing a new type of electric power source that is based on entirely different power supply criteria, using in practice biochemical phenomena to generate electric power with the possibility of continuously regenerating the source without having to recharge it electrically as instead occurs in the known art.

Within the scope of the above aim, a particular object of the invention is to provide an electric power source that constitutes a new source of energy in alternative to petroleum without having to use ecologically dangerous elements.

Another object of the present invention is to provide a power source having long endurance and reduced weight with respect to conventional electric batteries.

Another object of the present invention is to provide an electric power source which can be easily obtained starting from commonly commercially available elements and materials and is furthermore competitive from a merely economical point of view.

This aim, these objects and others which will become apparent hereinafter are achieved by a biochemically-powered self-exciting electric power source according to the invention, characterized in that it comprises, inside a container for containing an electrolyte, an anode which is coated with a biochemical compound, a first electrode, and a second electrode, which are electrically separated from one another and are immersed in said electrolyte, an electrical stimulator being furthermore provided which is connected between said anode and said first electrode, a user load being connectable between said second electrode and said anode.

BRIEF DESCRIPTION OF THE DRAWINGS

Further characteristics and advantages will become apparent from the following detailed description of a preferred but not exclusive embodiment of a biochemically-powered self-exciting electric power source, illustrated only by way of non-limitative example with the aid of the accompanying drawings, wherein:

FIG. 5 is a sectional view of the container;

FIG. 6 is a side view of the plates that form the cathode, the anode and the exciter electrode;

FIG. 7 is an exploded lateral elevation view of the plates; and

DESCRIPTION OF THE PREFERRED EMBODIMENTS

Figure 1:
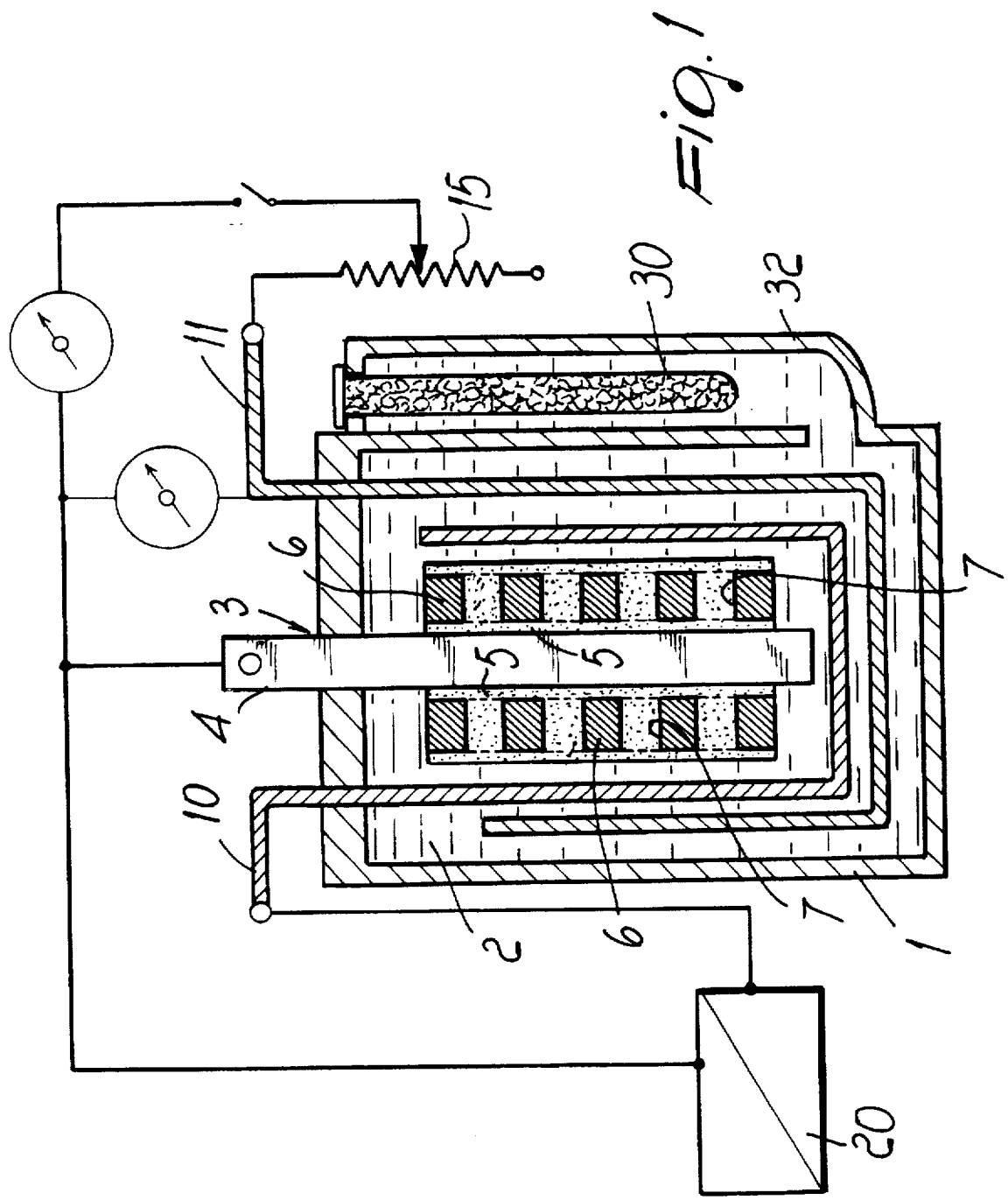
FIG. 1 is a sectional view of the electric power source.
Figure 2:
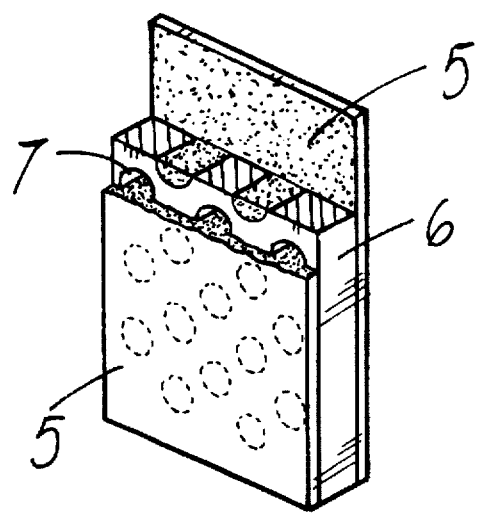
FIG. 2 is a partially cutout view of the shape of the anode.

With reference to FIGS. 1 and 2, the biochemically-powered self-exciting electric power source according to the invention comprises a container 1 inside which there is an electrolyte 2 which is advantageously constituted by a semiliquid solution composed of pure nickel acetate in 70% double distilled water.

Inside the container 1 there is an anode, generally designated by the reference numeral 3, which is constituted by a pure nickel plate 4 on the faces whereof a gummy biochemical compound, designated by the reference numeral 5, is applied; said biochemical compound is constituted by a spurge latex which is brought to the gummy state in a colloid with 10% alumina and 30% pure nickel acetate.

The biochemical compound is supported by the surface of panels 6 provided with holes 7 and superimposed on the surface of the plate 4.

During assembly, the panels are pressed for approximately 12 hours so that the biochemical compound adheres perfectly to all the points corresponding to the holes 7.

A first electrode 10 and a second electrode 11 are provided inside the container 1, face one another and the anode 3 as well, without however having a direct electrical connection.

Advantageously, in order to increase the mutually coupled surfaces the electrodes 10 and 11 are substantially folded in a U-like shape so that they are laterally adjacent to the anode 3 too.

An electrical stimulator, designated by the reference numeral 20, is located between the first electrode 10 and the anode 3 and can be constituted by an oscillator suitable to generate a square-wave frequency or by a generator of pulses induced by means of a rotating magnet.

The action of the electrical stimulation on the biochemical compound has the purpose of producing an increase in voltage and current which is a few hundred times higher than the intensity received by the electrical stimulator.

The first electrode 10 is advantageously made of cadmium, whereas the second electrode 12 is made of electrolytic aluminum.

A load, generally designated by the reference numeral 15 and schematically represented by a variable resistor, can be applied between the second electrode 11 and the anode 3; of course it is possible to change in any way the type of load that can be applied.

To regenerate the generator there is a container 30 of active material to be introduced in the electrolyte; the active material is advantageously constituted by a compound of sodium chloride with 30% potassium, and said container is advantageously a filter which can be inserted in an extension 32 that flanks said container and is connected so as to allow the flow of fluids.

Figure 3:
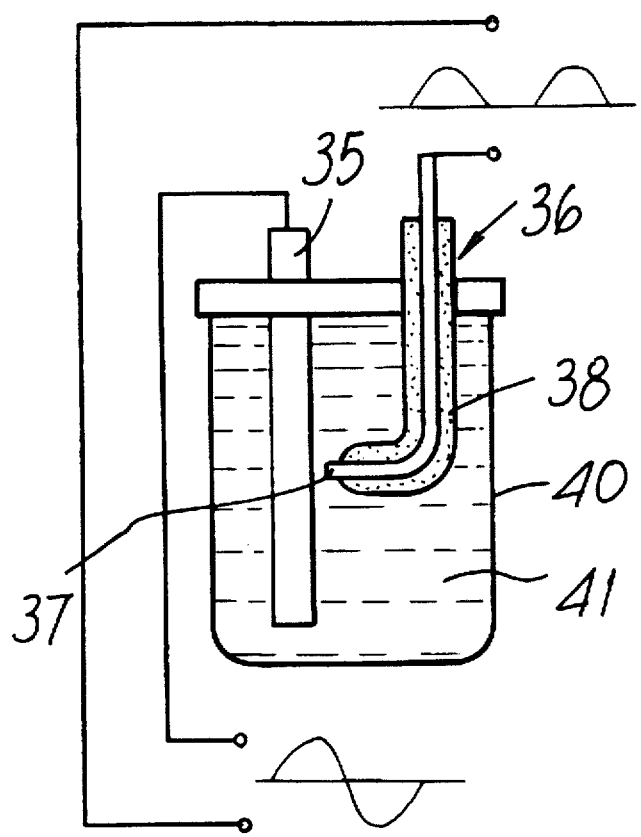
FIG. 3 is a view of a biochemically-powered rectifier.
Figure 4:
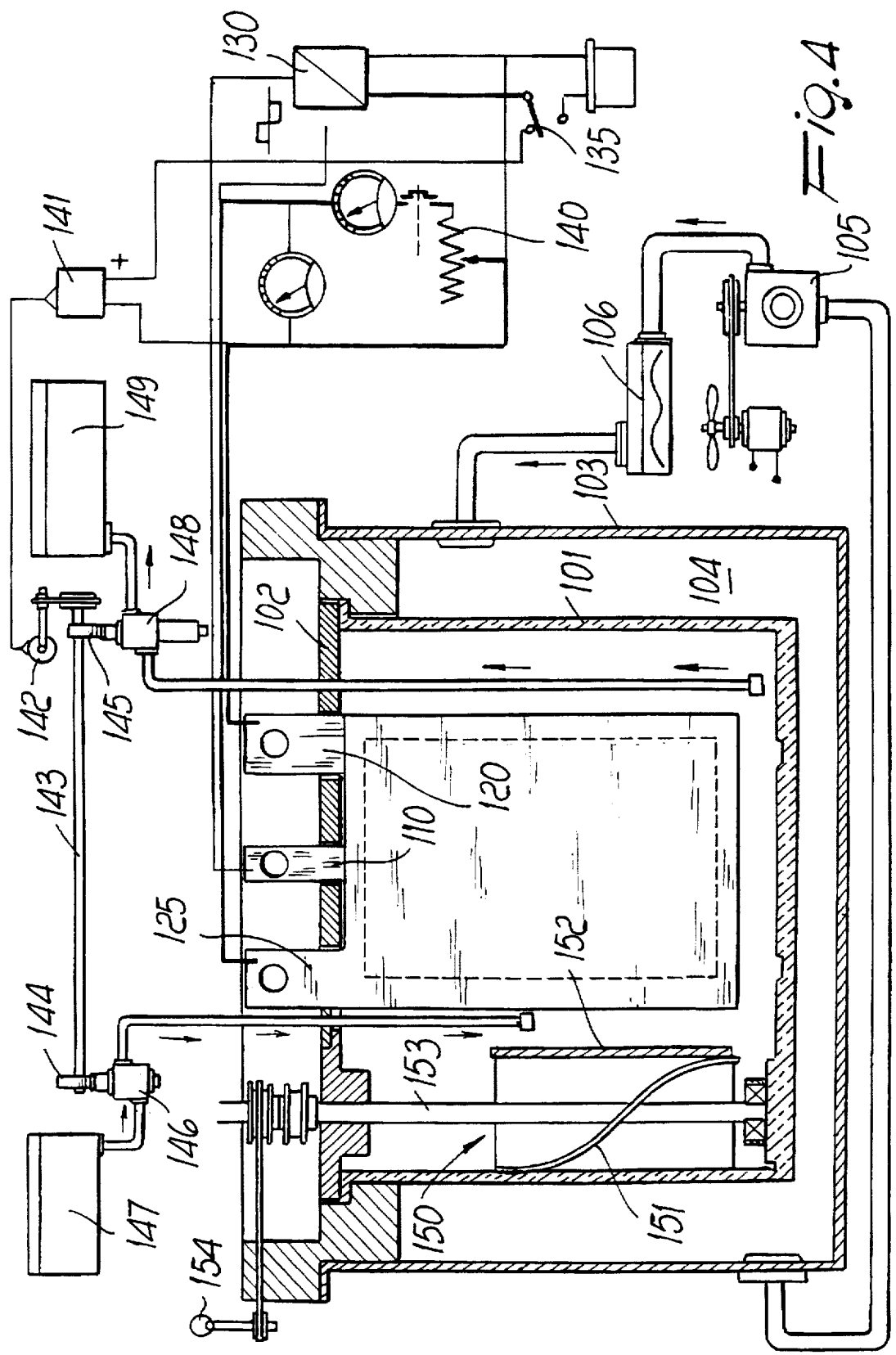
FIG. 4 is a schematic view of another embodiment of the electric power source according to the invention.
Figure 8:
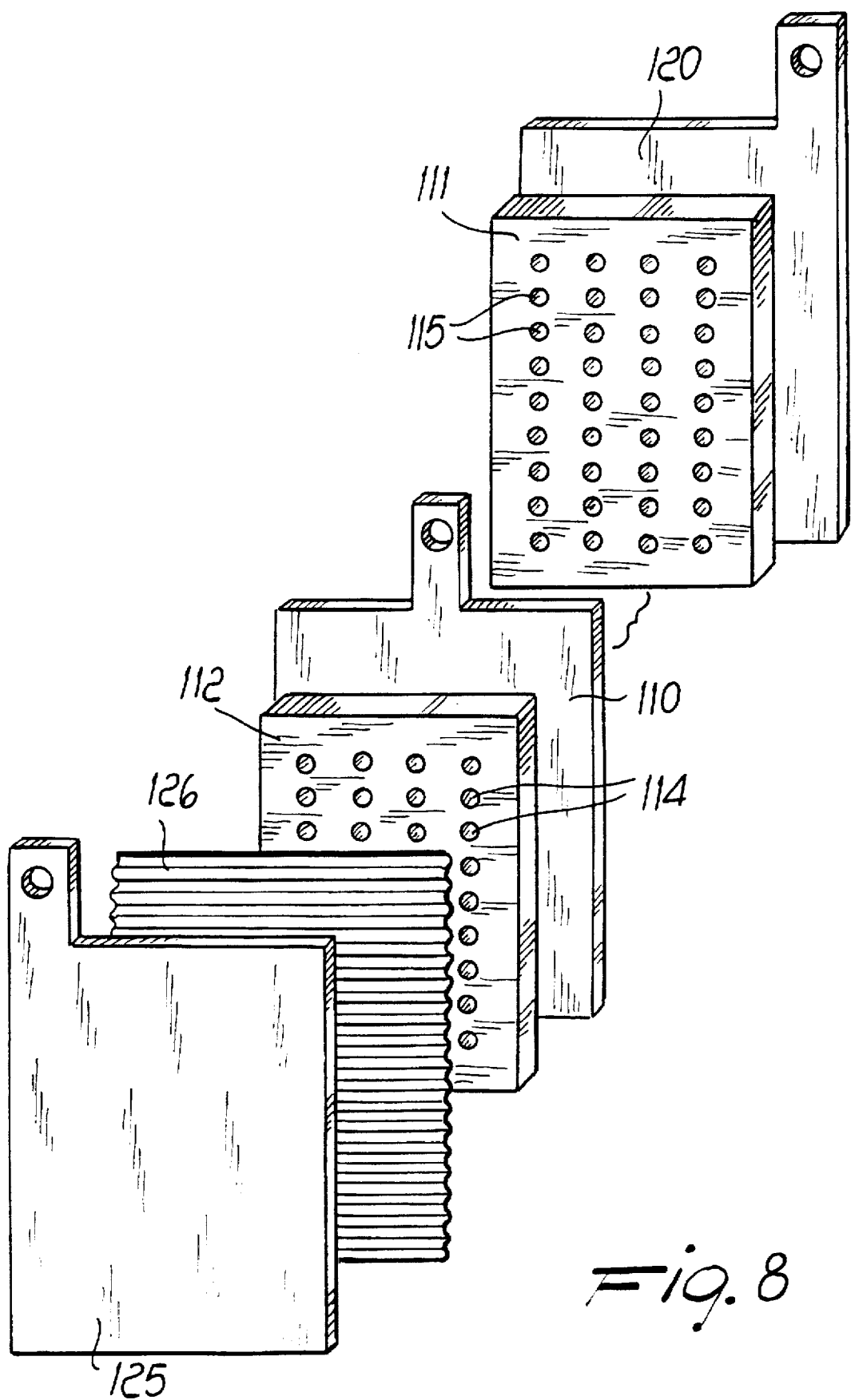
FIG. 8 is an exploded perspective view of the plates.

By using the same constructive concepts it is possible to produce a biochemical voltage rectifier which is shown in FIG. 3 and has a container 40 in which a solution of spurge latex 41, condensed while hot and mixed while cold with 20% aqueous ammonia and 10% sodium bicarbonate, is introduced.

Inside the solution there are two electrodes 35 and 36: the electrode 35 is constituted by a plate of electrolytic aluminum, whereas the electrode 36 constituted by a platinum wire which preferably has a diameter of 1 mm and a tip 37 which is in contact with the solution, whereas the remaining part of the body is covered by an insulating sheath 38.

The first electrode is connected to an alternating-current circuit, whereas the electrode 36 forms a secondary circuit, so as to obtain rectification in output, transforming the alternating current into direct current.

According to another embodiment shown in FIGS. 4 to 8, the biochemically-powered self-exciting electric power source according to the invention comprises a container 101 made of electrically insulating material and sealingly closed at the top by a lid 102.

The container 101 is placed inside an external casing 103 which forms, in cooperation with the container 101, an interspace 104 in which a circulation pump 105 circulates a cooling fluid which, by passing through a heat exchanger 106, has the purpose of maintaining at a preset temperature the cooling liquid that circulates in the interspace 104.

Inside said container 101 there is a biochemical liquid which is advantageously based on spurge serum and whose composition and production will be clarified hereafter.

An anode 110 is immersed in the biochemical liquid and is constituted by a 99% pure nickel plate which preferably but not necessarily measures 15 by 18 cm and is approximately 3 mm thick.

A first layer 111 and a second layer 112 of electrically insulating material are applied on the larger faces of the anode 110, which preferably but not necessarily measure 14 by 17 cm, and are 6 mm thick.

Through holes 114 are provided on the layers 112 and 113 and are arranged so that their axes are at right angles to the face of the anode 110; said holes preferably have a diameter of 6 mm and are mutually spaced by 3 mm.

A biochemical mix designated by the reference numeral 116, whose composition will be clarified hereafter, is applied inside the holes 114. A cathode 120 is applied at the first layer 111 and is constituted by a cadmium plate which preferably but not necessarily measures 15 by 18 cm and is 2 mm thick.

An exciter electrode 125 is applied at the second layer 112 and is constituted by a plate made of electrolytic aluminum which preferably but not necessarily measures 15 by 18 cm and is 4 mm thick.

An insulating electric element is interposed between the electrode 125 and the second layer 112 and is constituted by a corrugated sheet 126 which maintains a preset distance between the second layer 112 and the exciter electrode 125.

An exciter acts between the cathode 110 and the exciter electrode 125 and is advantageously constituted by a square-wave static oscillator 130 which, during the initial step, causes the self-excitation of the biochemical liquid.

There is also a switch 135 that disconnects the exciter once power begins to be delivered to the load, which is generally designated by the reference numeral 140.

The switch connects an amperometric converter 141 which drives a motor 142 for replenishing the regeneration liquid which acts on a shaft 143 provided with eccentric elements 144 and 145 which are arranged in phase opposition and drive a pump 146 for supplying the replenishing liquid which draws from a replenishing reservoir 147 and a pump 148 for recovering the liquid extracted from the cell which draws inside the container 101 and introduces the liquid in a collection reservoir 149.

The activation of the amperometric converter 141 is a direct function of the delivered power, and accordingly the amount of replenishing liquid introduced increases as the delivered electric power increases and decreases as said power decreases.

Inside the container 101 there is also an agitator unit, generally designated by the reference numeral 150, which comprises an impeller 151 which is advantageously ducted in a protective casing 152 and is connected to a shaft 153 that sealingly protrudes from the container and is driven by an appropriate motor, generally designated by the reference numeral 154.

The agitator has the purpose of keeping the biochemical liquid inside the cell constantly in motion.

Spurge is used to obtain the biochemical compound and the biochemical liquid; this is a tropical plant of the Euphorbiaceae family, and in chemical terms the milky sap contained in its fiber contains 60% carbon and 40% hydrogen and is classified as a hydrocarbon with the same characteristics as petroleum; the latex is poisonous, acrid and gummy.

In order to produce the biochemical liquid and the biochemical compound, the spurge is collected and left for approximately 24 hours in a vat with the addition of water so as to completely cover it.

By way of example, approximately 1200 g of spurge is taken and shredded finely; then, after covering the spurge with water, it is kept in this condition for 24 hours, as mentioned above.

The water contained in the mass is then separated by decantation, thus providing spurge serum.

The macerated plant is kept for approximately 3 hours at the temperature of 80° C., adding 100 g of pure nickel acetate in multiple steps while mixing all the time.

When the mass has cooled, it is then mixed with 150 g of potassium bichromate, 50 g of alumina and 50 g of aqueous ammonia, bringing the mixture to the boiling point again for approximately 20 minutes.

In the end the compound is gummy and is applied with a spatula in the holes 114 of the layers 111 and 112 which are applied to the anode 10, so that said compound 116 comprised within the holes 114 closely adheres to the metal.

Once this preliminary operation has been performed, the cadmium plate is superimposed in contact with the biochemical compound, whereas the insulating sheet and then the aluminum plate are superimposed on the other side so that the aluminum plate that constitutes the excitation electrode remains insulated from the biochemical compound.

Finally, once the pack of three electrodes has been obtained, as shown in FIG. 6, the assembly is subjected to the pressure of a 1-kg weight for approximately 24 hours, possibly in ambient air.

The spurge serum extracted previously to constitute the biochemical liquid is taken in the amount of 600 g, adding 80 g of industrial nickel acetate, 50 g of potassium and a certain amount of water subjected to double distillation so as to entirely cover the plates.

In this manner, a cell is obtained that generates a voltage of 2.02 volts, 0.3 amperes for each square centimeter of anode surface.

The replenishing liquid is obtained with sodium chloride, such as pure rock salt, mixed with 30% potassium.

From the above description it is thus evident that the invention achieves the intended aim and objects, and in particular the fact is stressed that a power source is provided which can achieve the continuous delivery of current simply by having available a supply of active material which is constituted by sodium chloride with 30% potassium.

To the above it should also be added that inside the container it is possible to provide an electrostatic filter to remove any residual microscopic waste particles in the circulation of the electrically conducting solution, and it is optionally possible to replenish the substances that are dispersed during operation.

It was mentioned earlier that the gummy material is obtained by using plant products of the Euphorbiaceae family: it should be specified that the best results have been obtained by using *Calenzola peptus* or the like.

The invention thus conceived is susceptible to numerous modifications and variations, all of which are within the scope of the inventive concept.

All the details may furthermore be replaced with other technically equivalent elements.

What is claimed is:

1. Biological electric power source, comprising, inside a container for containing an electrolyte, an anode, a first electrode and a second electrode, which are electrically separated from one another and are immersed in said electrolyte, an electrical stimulator being furthermore provided which is connected between said anode and said first electrode, electric power being generated between said second electrode and said anode, said anode being constituted by a pure nickel plate coated with a gummy biochemical compound, said gummy biochemical compound being constituted by spurge latex brought to a gummy state in a colloid with 10% alumina and 30% pure nickel acetate, said spurge latex being obtained from plant products of the Euphorbiaceae family.

2. Electric power source according to claim 1, wherein said electrolyte is constituted by a semiliquid solution composed of pure nickel acetate in 70% double distilled water.

3. Electric power source according to claim 1, wherein said biochemical compound is supported by panels which are provided with holes and are superimposed on said plate.

4. Electric power source according to claim 1, wherein said first electrode and said second electrode face one another and are substantially folded in a U-like shape so that they both face said anode.

5. Electric power source according to claim 1, wherein said first electrode is made of cadmium.

6. Electric power source according to claim 1, wherein said second electrode is made of electrolytic aluminum.

7. Electric power source according to claim 1, wherein said electrical stimulator is constituted by an oscillator.

8. Electric power source according to claim 1, wherein said electrical stimulator is constituted by a generator of pulses induced by a rotating magnet.

9. Electric power source according to claim 1, comprising, on said container, an extension which flanks the container and is connected to it to allow the flow of fluid, and, said extension comprising an active material for regenerating said source.

10. Electric power source according to claim 9, wherein said active material is constituted by a compound of sodium chloride with 30% potassium.

11. Electric power source according to claim 9, wherein said active material is introduced in a filter that can be inserted in said extension.

12. Biological electric power source, comprising, inside a container of a biochemical liquid, an anode constituted by a nickel plate on the faces whereof layers of electrically insulating material are applied, said layers having through holes in which a biochemical compound is inserted in contact with said anode, a cathode constituted by a cadmium plate being applied on one of said layers, an excitation electrode constituted by an aluminum plate being applied on the other one of said layers with the interposition of an electrically insulating element, an exciter being connected between said anode and said excitation electrode, electric power being generated between said anode and said cathode, a unit being furthermore provided for regenerating said biochemical liquid, said regeneration unit being controlled by a detector that measures the delivered electric power.

13. Power source according to claim 12, comprising an external casing that forms, in cooperation with said container, an interspace for the circulation of a cooling fluid.

14. Power source according to claim 12, wherein said electrically insulating element is constituted by a corrugated sheet which is suitable to separate said aluminum plate from said biochemical compound.

15. Power source according to claim 12, wherein said exciter is constituted by a square-wave static oscillator.

16. Power source according to claim 12, wherein said unit for regenerating said biochemical liquid comprises an amperometric converter which drives a motor for replenishing a regeneration liquid, said motor acting on a shaft which is provided with eccentric elements arranged in phase opposition for the actuation of a pump for supplying the regeneration liquid which draws from a replenishing reservoir and of a pump for recovering the liquid extracted from said cell which draws inside said container and introduces the liquid in a collection reservoir.

17. Power source according to claim 16, wherein said regeneration liquid comprises sodium chloride mixed with 30% potassium.

18. Power source according to claim 12, comprising switch for the selective activation of said exciter and of said regeneration unit.

19. Power source according to claim 12, comprising a unit for agitating the biochemical liquid inside said container.

20. Power source according to claims 19, wherein said unit for agitating comprises an impeller which is ducted in a protective casing and connected to a shaft which sealingly protrudes from said container, a motor being furthermore provided for actuating said shaft.

21. Power source according to claim 12, wherein said biochemical compound is obtained by macerating 1200 g of shredded spurge and covering it with water for a 24-hour period, the water being decanted after maceration to extract spurge serum, the spurge in the macerated state being kept for approximately 3 hours at the temperature of 80° C., adding 100 g of pure nickel acetate in multiple steps while mixing continuously; cooling then the mass and mixing it with 150 g of potassium bichromate, 50 g of alumina and 50 g of aqueous ammonia, returning the mix to boiling point for 20 minutes to obtain a gummy compound that constitutes said biochemical compound.

22. Power source according to claim 12, wherein said biochemical liquid comprises 600 g of spurge serum, 80 g of industrial nickel acetate, 50 g of potassium, and an addition of water subjected to double distillation to completely cover said plates.

23. Electric power source according to claim 12, comprising, inside said container, an electrostatic filter for removing residual microscopic waste particles in the circulation of the electrically conducting solution.

* * * * *